Nov. 3, 1942.    J. J. KEMMER    2,300,729
LAWN BROOM
Filed March 3, 1941
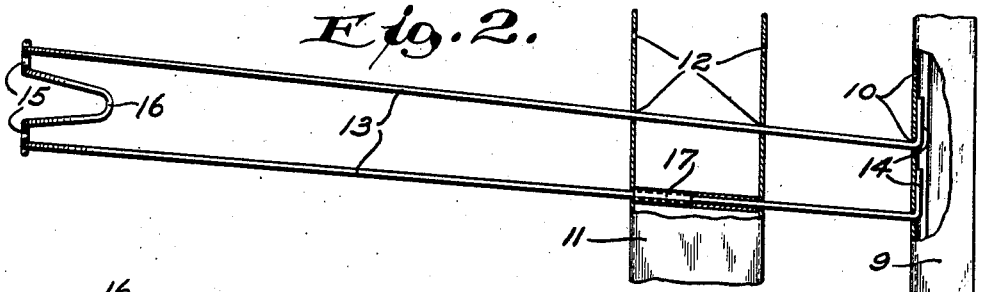
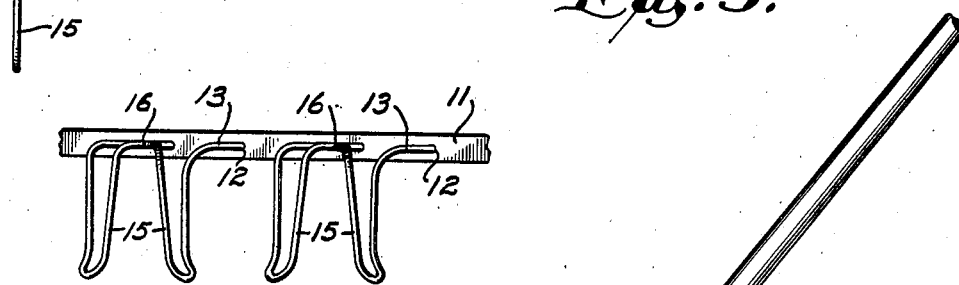
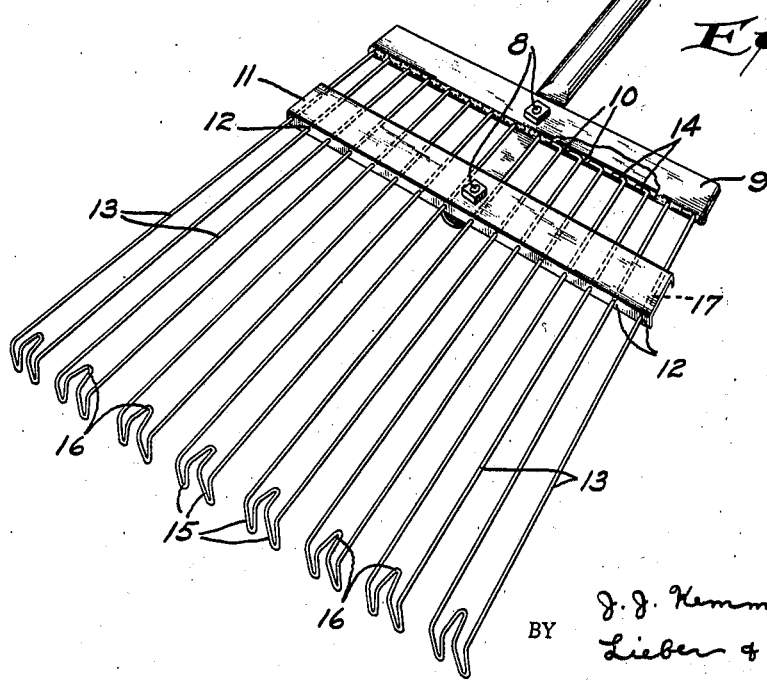
INVENTOR.
J. J. Kemmer
BY Lieber & Lieber
ATTORNEYS.

Patented Nov. 3, 1942

2,300,729

UNITED STATES PATENT OFFICE 2,300,729

LAWN BROOM

Jacob John Kemmer, Milwaukee, Wis.

Application March 3, 1941, Serial No. 381,427

5 Claims. (Cl. 56—400.17)

My present invention relates generally to improvements in the art of manufacturing lawn implements, and relates more specifically to improvements in the construction and operation of rakes of the broom type.

Generally defined, an object of my invention is to provide an improved lawn broom which is simple and durable in construction, which may be readily manufactured and assembled, and which may be sold at moderate cost.

Various types of implements have heretofore been utilized for removing debris from lawns, gardens, or the like. Some of these are of the common rake type wherein relatively short non-flexible tines or prongs are formed of heavy wire; while still others are of the broom type wherein numerous relatively long flexible prongs of cane or metal are employed. While the rake type has proven highly satisfactory for rough heavy work, this type has many disadvantages when utilized under ordinary conditions. The heavy prongs dig into the sod and uproot the grass, flowers or seed, and it is furthermore a tedious task to repeatedly lift the relatively heavy rake in actual use. It is also frequently necessary to remove leaves, paper and other debris from the stiff pointed tines which pierce the same so that a more effective job may be accomplished. The previous broom type likewise has many objectionable features even though it is employed quite widely for light work such as raking lawns. In the prior rakes of this type, wherein each wire forms a separate tine or prong, the tines frequently get out of alinement when a heavy object is engaged; the implement must be used with sweeping movements starting from an upright position, to be effective; leaves and other objects are often pierced by the tines necessitating removal thereof; the tines dig into the ground and uproot grass, seed and the like; and these previous rakes are absolutely useless for any degree of heavy work.

It is therefore a more specific object of the present invention to provide an improved rake of the broom type wherein the foregoing disadvantages of the prior assemblages are obviated.

Another specific object of the invention is to provide a simple rake which is equally effective for light work and for relatively heavy work, and in which each wire forms a plurality of relatively flexible blunt but effective tines.

A further specific object of my invention is to provide a rigidly constructed lawn rake having relatively long flexible tines and adapted to be utilized with equal effectiveness either as a broom with sweeping arcuate movements from an upright position, or as a rake with pulling movements toward the user and with the head and handle disposed at an oblique angle with respect to the surface being raked.

Still another specific object of my present invention is to provide a rake wherein the tines are firmly secured to the rake head and to each other so as to prevent permanent distortion thereof during normal usage.

An additional specific object of the invention is to provide a rake of the broom type, wherein the tines are so formed and shaped as to gather various sized stones, sticks, leaves and other debris with equal effectiveness, and without actually piercing thin flat-surfaced objects such as leaves and paper.

An additional specific object of my present invention is to provide a rake for diverse uses, which may be readily manufactured of standard stock materials at moderate cost, which is light in weight but extremely durable, and which may be used without injuring the sod, seeding, or the like.

These and other objects and advantages will be apparent from the following detailed description.

A clear conception of an embodiment of the invention, and of the mode of constructing lawn brooms in accordance with the improvement may be had by referring to the drawing accompanying and forming a part of this specification wherein like reference characters designate the same or similar parts in the several views.

Fig. 1 is a perspective view of one type of my improved rake, a portion having been broken away to disclose details of construction;

Fig. 2 is an enlarged top view of one of the multiple tines showing the same associated with fragments of its supports;

Fig. 3 is a side elevation of the tine structure of Fig. 2 showing the supports in section; and Fig. 4 is a similarly enlarged front view looking directly at several adjacent tines.

While the improved rake has been shown specifically as a lawn broom having relatively long flexible elements or wires arranged in fan or broom shape with each wire forming a pair of tines, it is not the intent to thereby unnecessarily restrict the scope, since the elongated elements or wires could obviously be made of various lengths and flexibility dependent upon the requirements and conditions of the work, and more than two tines could be formed of each wire without departing from the scope of the invention.

Referring to the drawing, the improved rake comprises in general a handle 7 having its lower end attached by means of bolt assemblages 8, to the medial portions of an elongated gripping bar 9 provided with a series of spaced perforations 10, and a likewise elongated retaining plate or channel bar 11 provided with spaced openings 12 in the flanges thereof; and a series of wires 13 piercing the openings 12 and each having the opposite ends thereof penetrating the perforations 10 and bent laterally as at 14 to a position parallel to the bar 9 for clamping confinement therein.

Each of the wires 13 is U-shaped and bent laterally and inwardly at its medial lower portion to form two or more tines 15 and a portion 16 is preferably bent a sufficient distance inwardly and upwardly to terminate above the lateral bend. The channel bar 11 is firmly secured in position by means of two or more collars 17 which may be secured about the wires 13 between the flanges of the channel bar 11 after the same is properly positioned. While each wire 13 may be provided with a collar 17, this is unnecessary and results in additional manufacturing expense, and it is preferable to provide collars 17 on only the outermost or end wires. The securing of the collars 17 to the wires 13 may be effected in any suitable manner, as by center-punching, pressing or welding.

In assembling the improved rake the wires 13 are first bent to U-shape from spring wire stock, the medial portion 16 of each wire is bent inwardly to the proper extent, and the resulting fingers are bent laterally to form the tines 15. The straight ends of the wires 13 are then passed through the openings 12 of the channel bar 11 and through the collars 17 positioned between the flanges of the channel bar, and the extreme ends of these wires are then passed through the perforations 10 in the bar 9 and are bent laterally at 14 to a position parallel to the bar 9 so as to prevent endwise removal thereof. After all of the wires 13 are thus properly formed and positioned and the ends thereof have been bent laterally, the bar 9 is folded and tightly clamped along the row of perforations 10, to thereby firmly grip the bent ends 14 of the wires 13 therebetween. The handle 7 may then be applied either above or below the bars 9, 11 and attached thereto by means of bolt assemblages 8 in an obvious manner, and the collars 17 may be finally rigidly secured to the wires 13 to complete the rake assemblage.

It will be noted that any number of wires 13 may be provided and that a greater number of tines may be formed of each wire as desired. The wires may also be formed stiffer and of shorter length for heavy work where a lesser amount of flexibility is needed.

From the foregoing detailed description it will be apparent that my present invention provides an improved rake assemblage wherewith small or large objects may be gathered with equal effectiveness without injury of the sod by sharp tines, and without frequent cleaning of the tines. The rake may obviously be readily manufactured of wire and sheet metal stampings at relatively low cost and with a minimum of materials, and the handle may be readily detached for convenient shipping. By having the portion 16 bent inwardly a sufficient distance beyond the lateral bend, the tines will more effectively gather debris and can be more readily freed of debris which may gather thereon. The improved lawn broom may obviously be constructed with simple tools and without resorting to welding in order to keep the parts assembled.

It should be understood that it is not desired to limit this invention to the exact details of construction or to the precise mode of use, herein shown and described, since various modifications within the scope of the claims may occur to persons skilled in the art.

I claim:

1. In a rake, an elongated clamping bar having an alined series of spaced perforations, an elongated channel bar having a series of spaced openings in the flanges thereof, a series of U-shaped wires retained within said spaced openings and each of said wires having its opposite ends penetrating said spaced perforations for clamping within said clamping bar, and a handle formed for attachment to said clamping bar and said channel bar.

2. In a rake, an elongated clamping bar having an alined series of spaced perforations, an elongated channel bar having a series of spaced openings in the flanges thereof, a series of U-shaped wires retained within said spaced openings and each of said wires having its opposite ends penetrating said spaced perforations for clamping within said clamping bar, collars adapted to snugly engage one or more of said wires between the flanges of said channel bar, and a handle formed for attachment to said bars.

3. In a rake, an elongated member, a plurality of wires forming tines remote from said member and having their corresponding ends rigidly attached to the member, a retaining bar having spaced flanges pierced by the medial portions of said wires, and collars snugly embracing some of said wires between said flanges.

4. In a rake, a support, and a series of U-shaped wires each having elongated end portions lying in a common plane and fixed at their free ends to said support, the opposite corresponding ends of the elongated side portions extending downwardly away from said portions and upwardly toward said plane to form a pair of laterally spaced tines interconnected by a V-shaped portion of the wire lying in said plane and extending rearwardly away from said tines.

5. In a rake, a support, a continuous wire bent at its medial portion and having elongated end portions lying in a common plane and secured at their free ends to said support, the opposite corresponding ends of the elongated side portions extending laterally from said portions and upwardly toward said plane to form a plurality of tines interconnected by a V-shaped portion of the wire disposed longitudinally of the side portions and extending away from said tines.

JACOB JOHN KEMMER.